Feb. 21, 1961  R. E. EWING  2,972,194
BLADE CUTTING ANGLE INDICATOR
Filed April 17, 1959  2 Sheets-Sheet 1
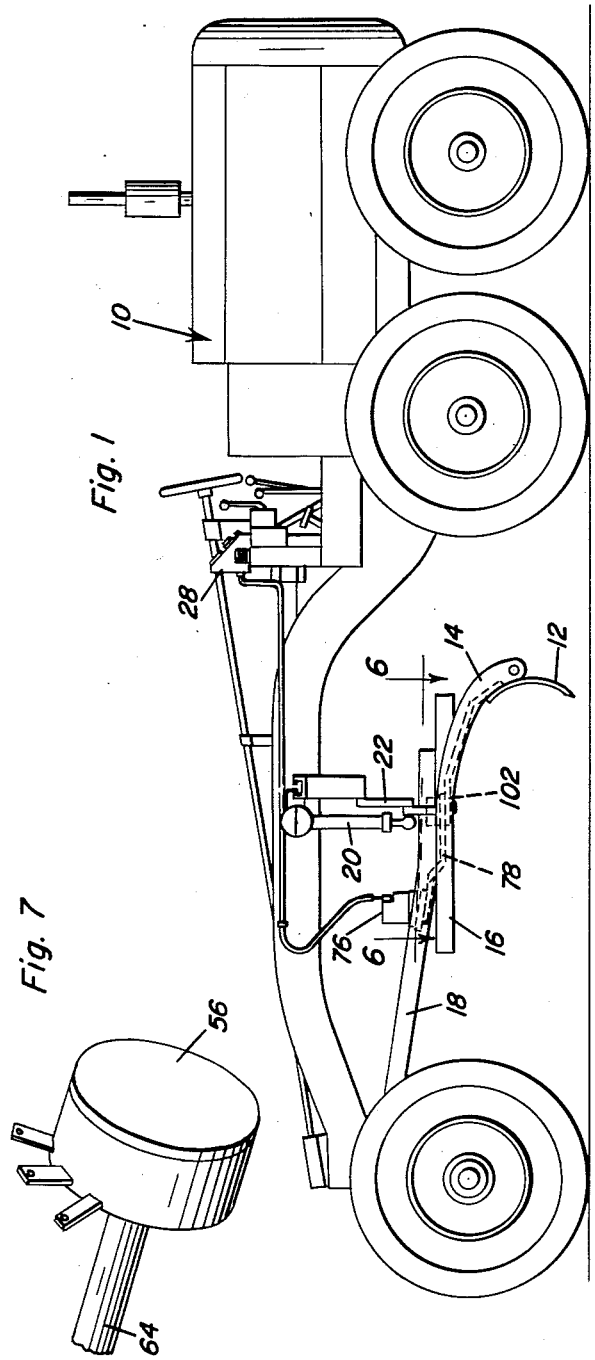
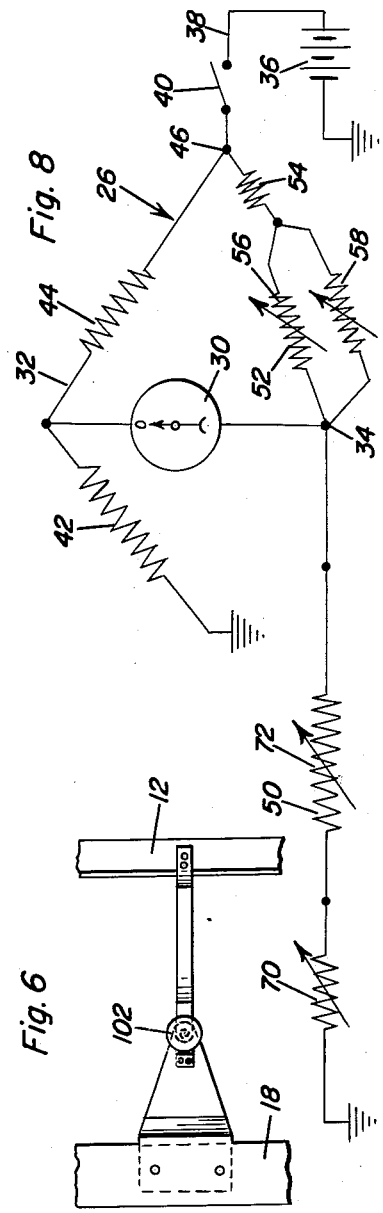
Raymond E. Ewing
INVENTOR.
BY *Clarence A. O'Brien*
and *Harvey B. Jacobson*
Attorneys Feb. 21, 1961 R. E. EWING 2,972,194
BLADE CUTTING ANGLE INDICATOR
Filed April 17, 1959 2 Sheets-Sheet 2
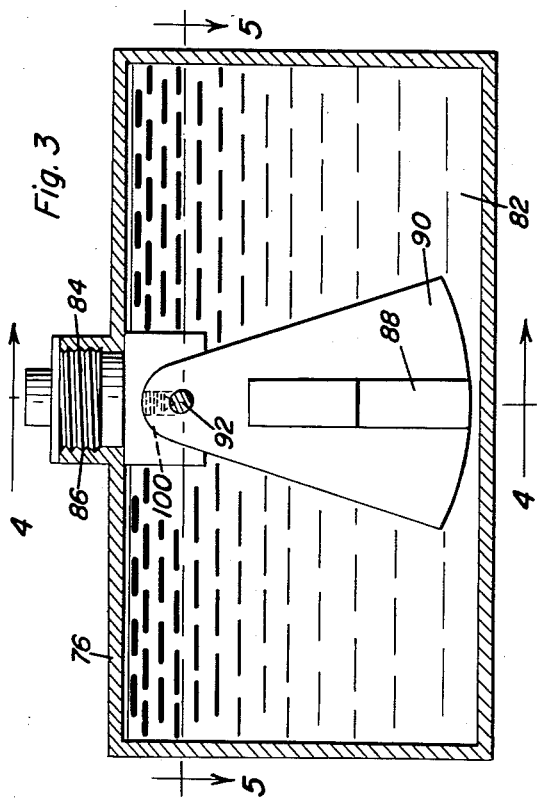
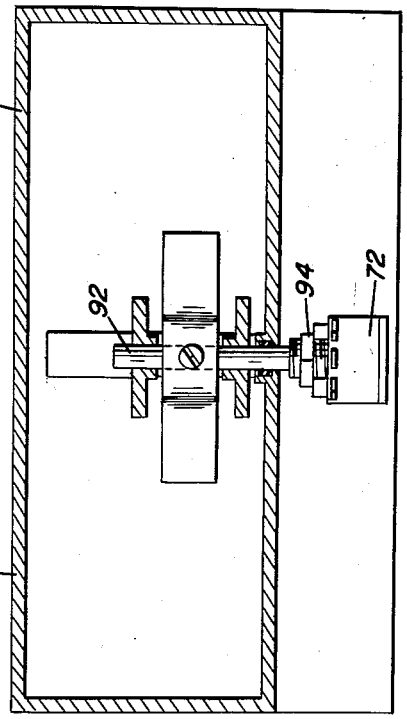
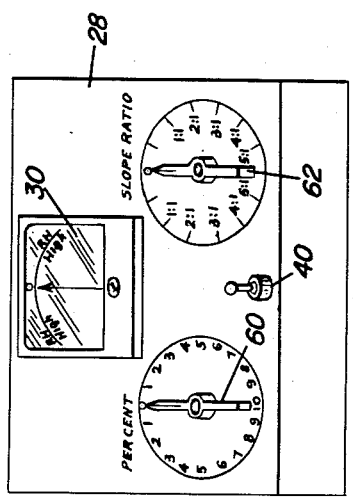
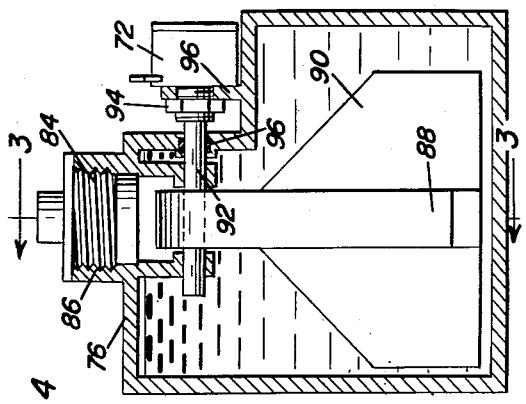
Raymond E. Ewing
INVENTOR.
BY *Clarence A. O'Brien*
*and Harvey B. Jacobson*
Attorneys

United States Patent Office 2,972,194
Patented Feb. 21, 1961

2,972,194

BLADE CUTTING ANGLE INDICATOR

Raymond E. Ewing, Box 32, Bruneau, Idaho

Filed Apr. 17, 1959, Ser. No. 807,055

5 Claims. (Cl. 33—215)

This invention relates to improvements in earth moving equipment such as graders, finishing machines of all types, bulldozers, scrapers, etc. More particularly, the invention relates to a blade cutting indicator so that the earth moving machine operator may be able to hold a true grade without relying wholly on the machine operator's judgement.

An object of the invention is to provide an electrically operated indicator by which the machine operator may observe a meter which shows deviations from a preset angularity for the earth moving machine blade.

Essentially, the blade angle cutting indicator is composed of a bridge circuit connected to a source of electrical potential and having four legs. Two of the legs are composed of fixed resistors connected in series and with the electrical source. The other legs are made of adjustable resistor assemblies, and there is a meter connected across the intermediate parts of the two sides of the bridge, one side including the pair of series connected fixed resistors and the other side including a pair of adjustable resistor assemblies. The meter may be selected from the group of commercially available meters, ordinarily galvanometers of the null type.

One of the assemblies is composed of two adjustable, series connected resistors, and one of these is mounted to automatically adjust when the blade of the earth moving machine is tilted about a longitudinal axis extending generally lengthwise of the earth moving machine. The other adjustable resistor in the assembly under consideration is also adjustable in response to blade movement. However, this adjustable resistance is a secondary control or compensating unit controlled by the rotation of the blade with respect to the longitudinal axis of the machine i.e. about a generally upright axis. Such compensation is necessary on machines where the plane of rotation of the blade is not parallel with the longitudinal axis or where the machine is adjusted so that the plane of rotation is moved to a position of non-parallelism with the first, longitudinal axis of the machine.

The other adjustable resistor assembly is composed of a fixed resistor and a pair of parallel connected resistors having their ends connected with one end of the fixed resistor. The fixed resistor is necessary only for design reasons, but the two adjustable, parallel connected resistors are for coarse and fine adjustment of the bridge circuit. In a preferred embodiment of the invention the parallel connected resistors have pointers, knobs, etc. Appropriate graduations and indicia adjacent to them are provided so that the machine operator may first decide on the desired angle or slope at which the machine blade should be set, after which he adjusts the coarse and fine adjustable resistors so as to preset the bridge circuit to respond to the angle to be cut by the blade.

When the parallel connected adjustable resistors have their dials set on zero, the blade or optionally, the frame supporting the blade, depending on the particular installation of the first described adjustable resistors, is level from side to side and the bridge circuit is balanced so that the indicator pointer or the like is in its zero position. Adjustment of the parallel connected resistors enables the operator to set the circuit to the desired slope and angle to be cut thereby unbalancing the bridge circuit until the blade angle is adjusted to agree with the value that is preset by the parallel connected adjustable resistor setting. This again balances the bridge circuit by the action of the first assembly of series connected adjustable resistors. So long as the blade maintains this angle, the circuit will remain in balance, but as soon as this angularity of the blade is disturbed, the circuit becomes unbalanced corresponding in a reading on the meter and informing the machine operator that blade adjustment is required.

Accordingly, a further object of the invention is to provide a practical, simple and dependable attachment for an earth moving machine which enables the machine operator to actuate the machine more precisely by indicating to the machine operator the tilted condition of the blade at all times. As soon as the blade becomes tilted with reference to a preselected angularity, this tilting is communicated by way of a meter and deflection, to the machine operator so that he may properly make proper adjustments of the conventional controls on the machine to restore the blade to the preselected angle. As soon as the desired angle is attained, the meter will so indicate this.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a conventional earth moving machine equipped with a blade cutting angle indicator.

Figure 2 is an elevational view of a control box mounted in a place convenient to the machine operator.

Figure 3 is a longitudinal sectional view of the primary control unit which includes an adjustable resistor, and which is mounted on the blade of the earth moving machine or on a part which moves in a direction the same as the blade and through a distance at least proportional to the distance of movement of the blade about an axis extending lengthwise of the machine.

Figure 4 is a transverse sectional view taken on the line 4—4 of Figure 3.

Figure 5 is a sectional view taken on the line 5—5 of Figure 3.

Figure 6 is an enlarged fragmentary sectional view, parts omitted, and taken approximately on the line 6—6 of Figure 1.

Figure 7 is a perspective view of an adjustable resistor used in the indicator.

Figure 8 is a wiring diagram showing the electrical components of the indicator.

In the accompanying drawings, a conventional earth moving machine is shown. This machine is used only to schematically represent the various types of earth moving machines which are equipped with blades. The blade 12 of machine 10 is attached by brackets 14 to circle 16 beneath drawbars 18. Blade lift links 20 and side shift links 22 which are operatively connected with a part of the circle 16 assembly, enable the blade 12 to be adjusted about a generally upright axis with reference to machine 10 and also about a longitudinal axis extending generally lengthwise of the machine. The illustrated machine 10 is capable of considerably more maneuvers and adjustments, but these are mentioned to explain the operation of blade cutting angle indicator 26.

Indicator 26 is made in several units. There is an indicator casing 28 mounted in a place which is convenient to machine operator. The casing contains a meter 30, for instance a null type galvanometer, connected across legs 32 and 34 of a Wheatstone bridge circuit. The galvanometer meter has its pointer at a null position during the time that the bridge circuit is in balance. As soon as the bridge circuit becomes unbalanced, the needle will deflect from the null position.

Reference is made now to Figure 8 for a general description of the indicator and for a description of the operation thereof. A source 36 of electrical potential, for example the battery circuit of machine 10, is shown connected to ground and connected by a conductor 38 to control switch 40. Switch 40 is mounted in a convenient place, for example, on casing 28. The bridge circuit has a leg 32 composed of two fixed resistors 42 and 44 connected in series and connected to a terminal 46 on the switch controlled side of conductor 38. Leg 34 of the bridge circuit has two adjustable resistor assemblies 50 and 52. The assembly 52 is made of a fixed resistor 54 connected to the terminal 46 and connected to the common ends of adjustable resistors 56 and 58.

Casing 28 has two pointers 60 and 62 mounted thereon, these being at the end of a shaft, for instance shaft 64 (Figure 7) of a typical adjustable resistor 56. Graduations and other nomenclature may be provided on the casing 28 with which the pointer 60 coacts. The same applies for adjustable resistor 58 to which pointer 62 is connected. Coarse and fine adjustments of the bridge circuit are obtained by adjusting the pointers 60 and 62, thereby adjusting the parallel connected resistors 56 and 58. As will become subsequently evident the resistors 56 and 58 are adjusted to place the bridge circuit in an unbalanced condition, to be restored to balance by adjustment of the resistors in assembly 50.

The fine adjustments indicated are for surface work, such as the top of a road or airport. The top of the road is "crowned" on the tangent and "supered" on the curves. The percentage of "super" depends on the severity of the curve. The "crown" is usually two percent and the "super" from one percent to ten percent. On the other hand, the coarse adjustment indicates slope ratio, as for ditch banks, cut banks, or back slopes. These slopes are always given in ratios instead of percentages.

The assembly has a pair of series connected adjustable resistors 70 and 72 with one end thereof connected to the common ends of the parallel resistors 56 and 58, and the other end connected to ground. Since resistor 42 is also connected to ground, the bridge circuit is complete. Resistor 72 constitutes a part of the primary control unit 76 (Figures 3–5) which is attached to the blade 12 by means of a bracket 78 or which is attached to any other part of the machine 10, or some other machine of the same general type, which moves in a direction and through a distance proportional to the tilting of the blade about the lengthwise axis of adjustment of the blade. The primary unit 76 is constructed of a housing 80 containing liquid 82, for example oil, and having a filler plug 84 in the top filler opening 86 thereof. Pendulum 88 having anti-splash vanes 90 thereon, is adjustably secured to shaft 92 of adjustable resistor 72. The adjustable resistor, is fastened, for instance by nut 94, to a mounting flange 96 of housing 80. Shaft 92 extends through a bearing having a seal 96 in a wall of the housing 80 and has the upper end of pendulum 88 fastened to it by means of setscrew 100 or an equivalent adjustable fastener. Therefore, as the blade 12 tilts about the longitudinal axis of rotation which is generally lengthwise of machine 10, housing 80 is tilted to a corresponding angle, but the pendulum remains vertical. The result is that the resistor body is rotated since it is fixed to the housing 80, but shaft 92 remains fixed.

Compensating unit 102 (Figure 6) has adjustable resistor 70 and is used to eliminate errors in slope angle with the machine wherein the plane of rotation of the blade circle is not parallel with the line of grade (from front to back). The compensating unit 102 is controlled by the rotation of the blade with respect to the longitudinal axis of the machine. Unit 102, therefore, is secured at the center of circle 16 and has the shaft of the adjustable resistor connected with the circle to be adjusted therewith.

On machines where the pendulum assembly can be mounted directly on the moldboard brackets, a simpler construction may be made. The two potentiometers in the meter box may be omitted, and a direct reading obtained on the meter, showing the angle of the blade at all times. This would leave a potentiometer on the pendulum to work directly on the meter, and would eliminate the necessity of presetting the dials for the angle desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an earth moving machine which has a blade which is adjustable about a first axis extending approximately lengthwise of the machine and adjustable about a second axis extending approximately upwardly of the machine, an indicator for the blade cutting angle comprising a bridge circuit provided with a pair of fixed resistors and a pair of adjustable resistor assemblies, a null meter connected across said resistors and resistor assemblies between the resistors of said pair thereof and between the assemblies of the pair thereof, said pairs connected at one end of each to a source of electrical potential and connected to ground at the opposite end, one of said assemblies including a first adjustable resistor, a fluid casing, a pendulum in said fluid casing and attached to said adjustable resistor to adjust said adjustable resistor and thereby unbalance said bridge circuit in response to tilt of said blade about said first axis, mechanical means mounting said casing for tilting movement when the blade tilts about said first axis, said one assembly also including a second adjustable resistor to compensate for blade tilt accompanying adjustment of said blade about said second axis when the plane of adjustment is at an angle to said first axis, means connecting said second resistor with the blade for adjustment as said blade is moved about said second axis, said second adjustable resistor connected in series with said first adjustable resistor.

2. In an earth moving machine which has a blade which is adjustable about a first axis extending approximately lengthwise of the machine and adjustable about a second axis extending approximately upwardly of the machine, an indicator for the blade cutting angle comprising a bridge circuit provided with a pair of fixed resistors and a pair of adjustable resistor assemblies, a null meter connected across said resistors and resistor assemblies between the resistors of said pair thereof and between the assemblies of the pair thereof, said pairs connected at one end of each to a source of electrical potential and connected to ground at the opposite end, one of said assemblies including a first adjustable resistor, a fluid casing, a pendulum in said fluid casing and attached to said adjustable resistor to adjust said adjustable resistor and thereby unbalance said bridge circuit in response to tilt of said blade about said first axis, mechanical means mounting said casing for tilting movement when the blade tilts about said first axis, said one assembly also including a second adjustable resistor to compensate for blade tilt accompanying adjustment of said blade about said second axis when the plane of adjustment is at an angle to said first axis, means connecting said second resistor with the blade for adjustment as said blade is moved about said second axis, said second adjustable resistor connected in series with said first adjustable resistor, the other of said assemblies including a pair of trimming resistors connected in parallel to balance said bridge circuit to correspond with a desired blade tilt angle.

3. A blade cutting angle indicator for an earth moving machine which has a blade adjustable about a first axis extending generally lengthwise of the machine and a second axis extending upward of the machine, said indicator comprising a bridge circuit having two pairs of legs, a meter connected between elements of each leg to indicate bridge circuit balance and unbalance, one of said legs having at least one adjustable resistor to unbalance the bridge circuit, a primary control unit having a primary adjustable resistor, means mounting the primary adjustable resistor on a part of the machine which moves in response to tilting movement of the blade about said first axis thereby balancing the circuit so that further unbalance is indicated on the meter, an adjustable compensating resistor unit connected in series with the primary adjustable resistor and means mounting said adjustable compensating resistor unit on said machine for adjustment in response to movement of said blade about said second axis.

4. A blade cutting angle indicator for an earth moving machine which has a blade adjustable about a first axis extending generally lengthwise of the machine and a second axis extending upward of the machine, said indicator comprising a bridge circuit having two pairs of legs, a meter connected between elements of each leg to indicate bridge circuit balance and unbalance, one of said legs having at least one adjustable resistor to unbalance the bridge circuit, a primary control unit having a primary adjustable resistor, means mounting the primary adjustable resistor on a part of the machine which moves in response to tilting movement of the blade about said first axis thereby balancing the circuit so that further unbalance is indicated on the meter, an adjustable compensating resistor unit connected in series with the primary adjustable resistor, means mounting said adjustable compensating resistor unit on said machine for adjustment in response to movement of said blade about said second axis, said means mounting said primary adjustable resistor including a pendulum, a supporting structure on which said pendulum is mounted, a shaft constituting part of the adjustable resistor of said primary control unit and to which said pendulum is secured, and said adjustable resistor of said primary control unit having a resistor body secured to said structure.

5. The combination of claim 4 wherein said structure consists of a housing provided with a damping liquid, and said pendulum has damping vanes submersed in said liquid.

References Cited in the file of this patent

UNITED STATES PATENTS

| 1,732,397 | Braibant | Oct. 22, 1929 |
| 2,120,771 | Thompson | June 14, 1938 |
| 2,722,056 | Stimler | Nov. 1, 1955 |
| 2,893,134 | Shea et al. | July 7, 1959 |